US011332234B2

(12) United States Patent
Forte et al.

(10) Patent No.: US 11,332,234 B2
(45) Date of Patent: May 17, 2022

(54) CONTROL SYSTEM AND METHOD FOR AN ELECTRO-HYDRAULIC SERVO-ACTUATOR, IN PARTICULAR OF A TURBOPROPELLER ENGINE

(71) Applicant: GE Avio S.r.l., Rivalta di Torino (IT)

(72) Inventors: Pierpaolo Forte, Noicattaro (IT); Giuseppe Donini, Villanova d'Asti (IT); Cristian Lai, Bari (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 16/973,268

(22) PCT Filed: Jun. 28, 2019

(86) PCT No.: PCT/EP2019/067495
§ 371 (c)(1),
(2) Date: Dec. 8, 2020

(87) PCT Pub. No.: WO2020/002692
PCT Pub. Date: Jan. 2, 2020

(65) Prior Publication Data
US 2021/0362838 A1 Nov. 25, 2021

(30) Foreign Application Priority Data
Jun. 28, 2018 (EP) .................................. 18425049

(51) Int. Cl.
B64C 11/44 (2006.01)
B64C 11/38 (2006.01)
(Continued)

(52) U.S. Cl.
CPC ............. B64C 11/44 (2013.01); B64C 11/38 (2013.01); B64D 27/10 (2013.01); B64D 37/005 (2013.01);
(Continued)

(58) Field of Classification Search
CPC ....... F15B 2211/6656; F15B 2015/206; B64C 11/44; B64C 11/38; B64D 37/005
See application file for complete search history.

(56) References Cited

U.S. PATENT DOCUMENTS 5,740,782 A * 4/1998 Lowi, Jr. ................ F02M 53/04
123/446
6,003,811 A 12/1999 Trikha
(Continued)

FOREIGN PATENT DOCUMENTS

EP 0867362 A2 9/1998
JP 2021099122 A * 7/2021 ............. F02D 41/30
(Continued)

OTHER PUBLICATIONS

PCT International Search Report Corresponding to PCT/EP2019/067495 dated Jun. 28, 2019.
(Continued)

Primary Examiner — Brian M O'Hara
(74) Attorney, Agent, or Firm — Dority & Manning, P.A.

(57) ABSTRACT

A control system (50) for an electro-hydraulic servo-actuator (26) envisages: a controller (55), to generate a control current ($I_c$), designed to control actuation of the electro-hydraulic servo-actuator (26), implementing a position control loop based on a position error ($e_p$), the position error ($e_p$) being a difference between a reference position ($Pos_{ref}$) and a measured position ($Pos_{meas}$) of the electro-hydraulic servo-actuator (26); and a limitation stage (58), coupled to the controller (55) to provide a limitation of the actuator speed of the electro-hydraulic servo-actuator (26); the limitation stage (58) limits a rate of change of a driving current ($I_d$) to be supplied to the electro-hydraulic servo-actuator (26), in order to limit the actuator speed.

13 Claims, 5 Drawing Sheets

(51) Int. Cl.
*B64D 27/10* (2006.01)
*B64D 37/00* (2006.01)
*F15B 15/08* (2006.01)
*G05D 13/62* (2006.01)
*F15B 15/20* (2006.01)

(52) U.S. Cl.
CPC ............. *F15B 15/08* (2013.01); *G05D 13/62* (2013.01); *F15B 2015/206* (2013.01)

(56) References Cited

U.S. PATENT DOCUMENTS

| | | | |
|---|---|---|---|
| 6,137,187 A | | 10/2000 | Mikhail et al. |
| 2013/0220274 A1 | * | 8/2013 | Deshpande ......... F02D 19/0607 123/350 |

FOREIGN PATENT DOCUMENTS

| | | | | |
|---|---|---|---|---|
| WO | WO 99/07996 A1 | | 2/1999 | |
| WO | WO-2020002692 A1 | * | 1/2020 | ............. B64C 11/44 |

OTHER PUBLICATIONS

European Search Report Corresponding to Application No. 18425049 dated Nov. 23, 2018.

* cited by examiner

CONTROL SYSTEM AND METHOD FOR AN ELECTRO-HYDRAULIC SERVO-ACTUATOR, IN PARTICULAR OF A TURBOPROPELLER ENGINE

CROSS-REFERENCE TO RELATED APPLICATIONS

This patent application claims priority from European Patent Application No. 18425049.6 filed on 28 Jun. 2018, the disclosure of which is incorporated by reference.

TECHNICAL FIELD

The present solution relates to a control system and method for an electro-hydraulic servo-actuator, in particular of a turbopropeller (or turboprop) engine of an aircraft, to which the following disclosure will make explicit reference, without this implying any loss of generality.

BACKGROUND ART

FIG. 1 shows a perspective view of an exemplary aircraft 1, provided with a turbopropeller engine 2; only a propeller assembly 3 of the turbopropeller engine 2 is visible in the same FIG. 1.

The aircraft 1 includes an airframe 4 defining a cockpit 5; a single operator-manipulated input device (a power, or throttle, lever), 6, and an instrument control panel 7 having a display 8 are provided within the cockpit 5.

The propeller assembly 3 comprises a hub 9 and a plurality of blades 10, extending outwardly from the hub 9. A gas turbine of the turbopropeller engine 2 (here not shown) generates and transmits power to drive rotation of the propeller assembly 3, thus generating thrust for the aircraft 1.

As schematically shown in FIG. 2, the gas turbine of the turbopropeller engine 2, here denoted with 11, generally comprises:

an axial/centrifugal compressor 12, coupled to an air intake 13;

a high-pressure turbine 14, so called "gas generator", coupled to the axial/centrifugal compressor 12 via a gas generator shaft 15; and a low-pressure turbine 16, so called "power turbine", mechanically decoupled from the gas generator shaft 15 and driven by hot gas expansion.

The propeller assembly 3 is coupled to the gas turbine engine 11 via a propeller shaft 17 and a gearbox 18.

More specifically, the gearbox 18 can include a first gear 18a and a second gear 18b in mesh with the first gear 18a. The first gear 18a can be connected to the propeller shaft 17, in turn coupled to the hub 9 of the propeller assembly 3, and the second gear 18b can be connected to a power turbine shaft 17', in turn coupled to the low-pressure turbine 16. During operation, the gearbox 18 can step-down a rotational speed of the power turbine shaft 17', so that a rotational speed of the propeller shaft 17 can be less than the rotational speed of the power turbine shaft 17'.

An actuation assembly 19 is coupled to the propeller assembly 3, to determine the value of a variable pitch angle of the propeller blades 11.

The turbopropeller engine 2 is managed by an electronic control unit 20 (shown schematically in FIG. 2), that includes an electronic processing unit (e.g. a microprocessor, a microcontroller, or similar processing unit) provided with a non-volatile memory storing suitable software instructions, in order to implement an engine control strategy to meet input power requirements, originated from the operator-manipulated power lever 6. The electronic control unit 20 may define one or more of a full authority digital engine controller (FADEC), an engine control unit (ECU), an electronic engine control (EEC), a propeller electronic control unit (PEC).

The turbopropeller engine 2 further comprises: a temperature sensor 22, which is generally arranged within the air intake 13, in order to sense the temperature of engine intake air (that, during operation, flows over the same temperature sensor 22), and is configured to provide a measure of a sensed temperature $T1_{sens}$.

The sensed temperature $T1_{sens}$ measured by the temperature sensor 22 is relevant to control of the engine operation by the electronic control unit 20; in particular, together with a compressor speed Ng, the sensed temperature $T1_{sens}$ establishes the position of a Variable Stator Vane (VSV) device coupled to the compressor 12. In a known manner, this device has the purpose of "partializing" the air flow to the compressor 12, so as to avoid a stall condition.

FIG. 3 schematically shows the structure and operation of the VSV device, here denoted with 25.

An electro-hydraulic servo-actuator 26, provided with a torque motor, moves a piston 27 back and forth; a mechanical linkage 28 transforms the rectilinear motion of the piston 27 into a circular motion, thereby moving a series of blades 29 of a beta angle β into stator vanes 30 of the compressor 12. The rotation of blades 29, deviates the flow of air in the compressor 12, thus allowing to avoid an excess of air at low speed that would lead to stall of the compressor 12.

The electro-hydraulic servo-actuator 26 is electrically controlled by the electronic control unit 20, in particular by the FADEC, which calculates an angular position reference (i.e. the reference value of the beta angle β) for the control action, according to a corrected compressor speed $Ng_r$. In particular, this corrected compressor speed $Ng_r$ is the compressor speed Ng multiplied by a parameter that depends on an inlet temperature T2 (that is proportional to the sensed temperature $T1_{sens}$ measured by temperature sensor 22) based on the following expressions:

$$Ng_r = \frac{Ng}{\sqrt{\theta}}$$

$$\theta = \frac{T2[Kelvin]}{288.15}$$

$$T2 \cong kT1$$

wherein 288.5K (i.e. 15° C.) is the temperature at ISA (International Standard Atmosphere) condition at sea level.

Manufacturers of electro-hydraulic servo-actuators generally provide the nominal response characteristics curves of the actuators in terms of actuator speed versus driving current (where the actuator speed is a function of the driving, or command, current supplied to the actuator).

In most practical applications, the actuator slew-rate (i.e. the maximum rate of change per unit of time) has to be limited, in order not to overcome those limits that could compromise or impair correct operation.

In the practical example of the electro-hydraulic servo-actuator 26 of the VSV device 25, limiting the speed of the actuator is all the more important, considering that the control fluid for the actuator is the engine fuel.

Indeed, as schematically shown in FIG. 4, the same fuel coming from a fuel tank, here not shown, and provided by a fuel pump 30, is supplied to both a fuel metering valve FMV 32, that controls fuel supply to the turbopropeller engine 2, and to the electro-hydraulic servo-actuator 26, that controls the VSV device 25. As shown in the same FIG. 4, a return path 33 is also provided, for the fuel return flow.

During transients, an excessive speed of the electro-hydraulic servo-actuator 26 may steer too much fuel towards the same actuator, thereby causing a transient pressure drop and possibly impairing the correct operation of the turbopropeller engine 2.

Known solutions for controlling operation of electro-hydraulic servo-actuators envisage a limitation of the driving current supplied to the actuators at fixed maximum and minimum values, that are set to assure that the actuator speed does not overcome upper and lower limit values (imposed by design, as defined by the manufacturer).

FIG. 5 shows a known control system, denoted with 40, for an electro-hydraulic servo-actuator, here denoted with 41, generally implementing a closed loop control of the position of the actuator 41 based on a reference position $Pos_{ref}$ and a measured position $Pos_{meas}$ (in the example, the measured position $Pos_{meas}$ is provided by a position sensor 42, e.g. an inductive sensor, such as a LVDT—Linear Variable Displacement Transducer).

The control system 40 comprises:

a first adder block 44, receiving at a first (positive, or summation) input the reference position $Pos_{ref}$ and at a second (negative, or subtraction) input the measured position $Pos_{meas}$, as a feedback, measured by the position sensor 42, and providing at the output a position error $e_p$, as a function of the subtraction between the reference position $Pos_{ref}$ and the measured position $Pos_{meas}$; and a controller 45, e.g. of the PID (Proportional Integral Derivative) type, receiving at its input the position error $e_p$ and generating at its output, based on a regulation scheme, a control quantity $I_c$, for example an electrical current, designed to control actuation of the electro-hydraulic servo-actuator 41.

The control system 40 further comprises a saturation block 46, interposed between the controller 45 and the electro-hydraulic servo-actuator 41, configured to receive the control quantity $I_c$ and provide a saturation thereof to maximum and minimum values Max', Min', in case the same control quantity $I_c$ overcomes the same maximum and minimum values Max', Min'; the saturation block 46 thus provides a driving quantity $I_d$, in particular a driving current, for the electro-hydraulic servo-actuator 41.

FIG. 6 shows the characteristic curve of the electro-hydraulic servo-actuator 41; in particular, the nominal characteristic curve is shown with a solid line, while actual maximum and minimum characteristic curves, e.g. due to actuator ageing and other deterioration effects, are shown with dashed lines.

As clearly shown in this FIG. 6, the maximum and minimum values Max', Min' of the saturation block 46 are set at values that are lower than the limit values of the driving current, denoted with Max and Min, defined by the nominal characteristic curve of the electro-hydraulic servo-actuator 41 (and corresponding to actuator speed limits, denoted with $Speed_{Max}$ and $Speed_{Min}$).

Indeed, these maximum and minimum values Max', Min' have to guarantee, in an open-loop, even in a worst case scenario, that the actuator speed limits, denoted with $Speed_{Max}$ and $Speed_{Min}$ are not overcome, during the actuator life and for all actuator operating conditions. In this respect, and considering the practical example of the VSV actuator (discussed above), aerodynamic loads on the blades of the VSV device 25 may further deviate (in a substantially unpredictable manner) the actuator characteristic curve from the nominal characteristic curve, during actual operation of the electro-hydraulic servo-actuator 41.

A drawback of the discussed control system 40 is thus that of not allowing full exploitation of the capability of the electro-hydraulic servo-actuator 41.

Another known solution to limit the speed of an electro-hydraulic servo-actuator may envisage a mechanical limitation of the control fluid that is supplied to the same electro-hydraulic servo-actuator; however, this solution has a number of disadvantages, for example that of requiring heavy and complex hydraulic mechanisms, having a higher cost and entailing objective constructive difficulties.

DISCLOSURE OF INVENTION

The aim of the present solution is to provide an improved control solution for an electro-hydraulic servo-actuator, allowing to overcome the above discussed drawbacks of known control systems.

According to the present solution, a control system and a control method for an electro-hydraulic servo-actuator are therefore provided, as defined in the appended claims.

BRIEF DESCRIPTION OF THE DRAWINGS

For a better understanding of the present invention, preferred embodiments thereof are now described, purely as non-limiting examples, with reference to the attached drawings, wherein.

BEST MODE FOR CARRYING OUT THE INVENTION

As will be discussed in the following, an aspect of the present control solution envisages a closed loop control of the actuator slew rate (maximum operating speed), independently of the speed vs current characteristic curve; in particular, this closed loop control for the actuator speed envisages use of the actual actuator speed (evaluated as the derivative of a measured actuator position) in order to limit the rate of change of the actuator driving current, and therefore limit the maximum actuator speed.

Figure 7:
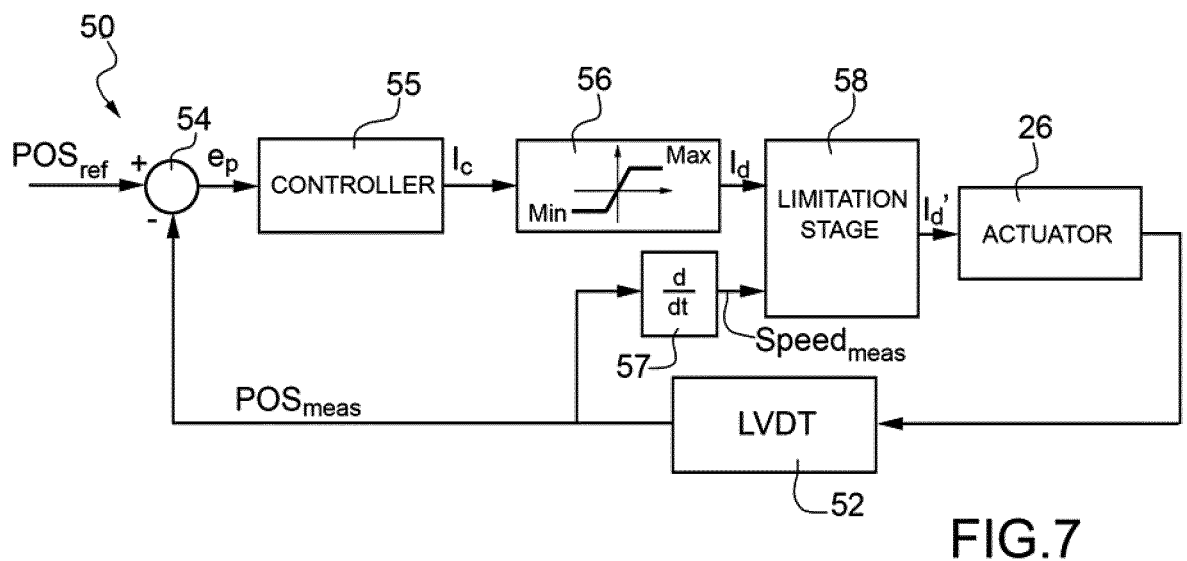
FIG. 7 is a schematic block diagram of a control system of an electro-hydraulic servo-actuator, according to an embodiment of the present solution.

FIG. 7 shows a control system, denoted with 50, according to a first embodiment of the present solution, exploiting the above discussed control solution, in order to provide a driving current to an electro-hydraulic servo-actuator, for example to the electro-hydraulic servo-actuator 26 of the VSV device 25 in the turbopropeller engine 2 (see also the above discussion).

The control system 50 includes, in a manner similar to what discussed before with reference to FIG. 5:

a first adder block, here denoted with 54, receiving at a first (positive, or summation) input the reference position $Pos_{ref}$ and at a second (negative, or subtraction) input the measured position $Pos_{meas}$, as a feedback, measured by a position sensor, here denoted with 52, e.g. an inductive position sensor, such as a LVDT transducer, and providing at the output a position error $e_p$, as a function of the subtraction between the reference position $Pos_{ref}$ and the measured position $Pos_{meas}$;

a controller, here denoted with 55, e.g. of the PID (Proportional Integral Derivative) type, receiving at its input the position error $e_p$ and generating at its output, based on a regulation scheme, a control quantity $I_c$, for example an electrical current, designed to control electro-hydraulic servo-actuator 26; and a saturation block, here denoted with 56, interposed between the controller 55 and the electro-hydraulic servo-actuator 26, configured to receive the control quantity $I_c$ and provide a saturation thereof to maximum and minimum values Max, Min, in case the same control quantity $I_c$ overcomes the same maximum and minimum values Max, Min, thereby providing a driving quantity $I_d$, in particular a driving current, for the electro-hydraulic servo-actuator 26.

Figure 6:
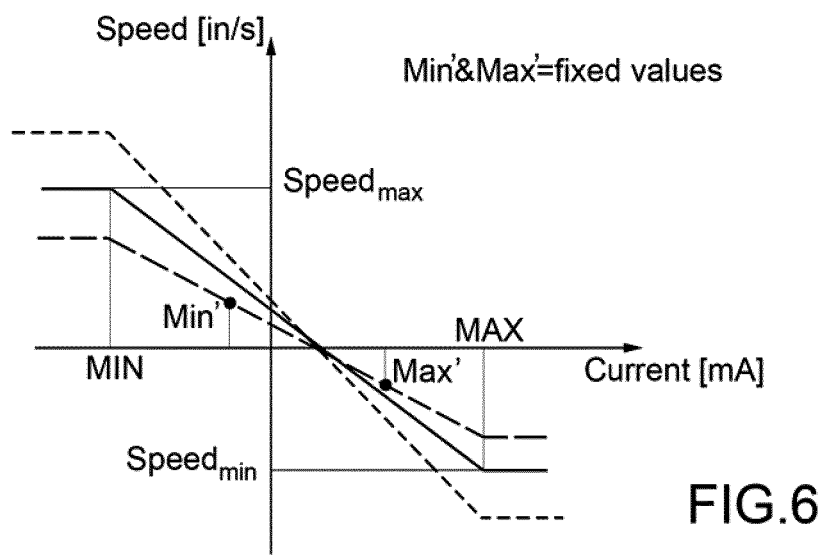
FIG. 6 shows plots of characteristic curves of the electro-hydraulic servo-actuator.

In the present solution, the maximum and minimum values Max, Min coincide with the limit values defined by the nominal characteristic curve of the electro-hydraulic servo-actuator 26, set by the manufacturer (see again FIG. 6 and the associated discussion), and are not set to lower values for safety reasons, as in known control solutions.

Operation of the saturation block 56 is such as to limit the maximum (absolute) value of the actuator speed, by limiting the maximum (absolute) value for the driving quantity $I_d$. As discussed above, however, this limitation may not be sufficient during transients, when, due to inertia effects, the instantaneous actuator speed may overcome the set maximum limits, notwithstanding the imposed driving current limitations.

According to an aspect of the present solution, the control system 50 therefore further comprises:

a derivative block 57, coupled to the position sensor 52, to receive the measured position $Pos_{meas}$ and configured to determine a measured actuator speed $Speed_{meas}$, as the derivative of the measured position $Pos_{meas}$; and a limitation stage 58, coupled to the derivative block 57 to receive the measured actuator speed $Speed_{meas}$ and to the output of the saturation block 56 to receive the driving current $I_d$, and configured to limit the rate of change of the driving current $I_d$ based on the measured actuator speed $Speed_{meas}$, thereby providing a rate-limited driving current $I_d'$ for controlling the electro-hydraulic servo-actuator 26.

Figure 8:
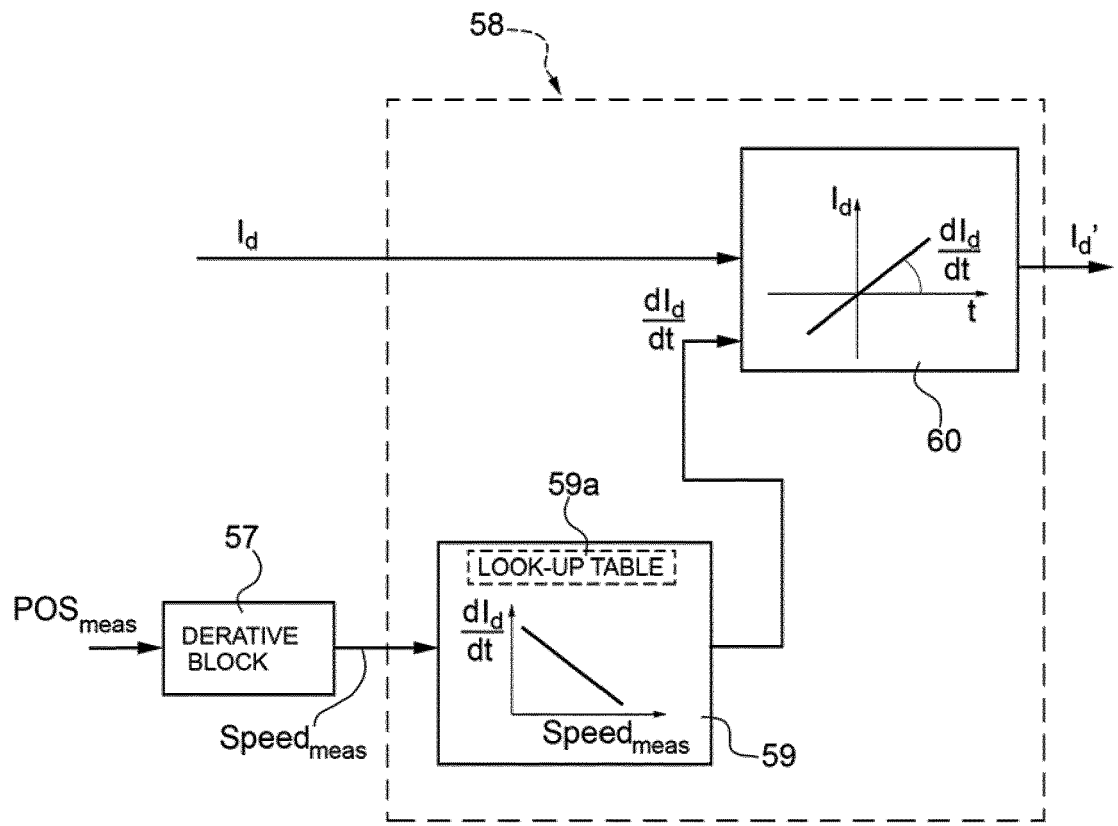
FIG. 8 is a schematic block diagram of a rate-limitation stage in the control system of FIG. 7.

In more detail, and as shown in FIG. 8, the limitation stage 58 comprises a determination block 59 implementing a look-up table 59a, to determine a maximum rate of change of the actuator current according to the actual actuator speed.

In particular, the look-up table 59a provides at the output a slew rate limit value $dI_d/dt$ for limiting the rate of change of the driving current $I_d$, corresponding to the value of the measured actuator speed $Speed_{meas}$ received at the input; the values stored in the look-up table 59a (in particular, the matching between the values of the slew rate limit value $dI_d/dt$ and the measured actuator speed $Speed_{meas}$ are determined via experimental results, aimed at determining the slew rate limit values $dI_d/dt$ that allow not to overcome the desired actuator speed limits, $Speed_{Max}$, $Speed_{Min}$.

In the embodiment shown in FIG. 8, the slew rate limit values $dI_d/dt$ and the values of the measured actuator speed $Speed_{meas}$ are linked by a linear inverse relationship, namely when the measured actuator speed $Speed_{meas}$ increases, the slew rate limit value $dI_d/dt$ decreases, and vice versa.

The limitation stage 58 further comprises a dynamic rate limiter 60, coupled to the determination block 59 to receive the determined slew rate limit value $dI_d/dt$, and to the output of the saturation block 56 to receive the driving current $I_d$.

The dynamic rate limiter 60 is configured to limit the slew rate of the input signal (i.e. the driving current $I_d$) based on the slew rate limit value $dI_d/dt$, thus providing the rate-limited driving current $I_d'$ for controlling the electro-hydraulic servo-actuator 26. The dynamic rate limiter 60 may be implemented in any known manner, here not discussed in detail, as will be clear for a skilled person.

In particular, as shown in the same FIG. 8, the slew rate limit value $dI_d/dt$ determines the maximum ramp slope of the pattern of the driving current $I_d$ vs time; in other words, the rate of change of the driving current $I_d$ is not allowed to exceed the slew rate limit value $dI_d/dt$.

It is to be noted that the slew rate limit value $dI_d/dt$ is proportional to the actuator acceleration (since the driving current $I_d$ is proportional to the actuator speed); accordingly, the dynamic rate limiter 60 operates according to the actuator acceleration providing the rate-limited driving current $I_d'$ so that the actuator speed limits ($Speed_{Max}$, $Speed_{min}$) are not overcome. In case the actuator speed increases, the acceleration command (i.e. the slew rate limit value $dI_d/dt$) decreases; this implements a preview control action that anticipates the speed reduction. The look-up table 59a is properly tuned to set the maximum rate of change of the actuator speed.

Figure 9A:
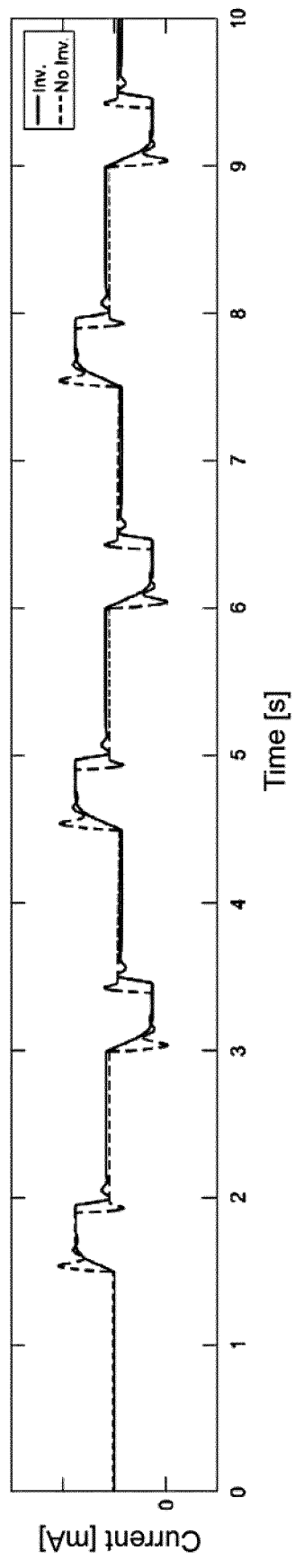
FIGS. 9A-9B shows plots of electrical quantities relating to performance of the control system of FIG. 7, compared to a known control system.
Figure 9B:
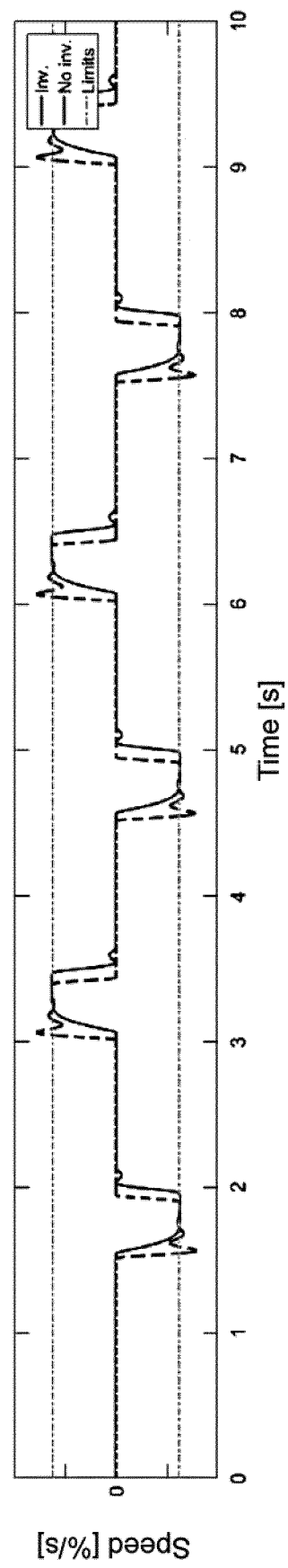

FIGS. 9A-9B show simulation results relating to the performance of the discussed control action compared to known control solutions.

Figure 1:
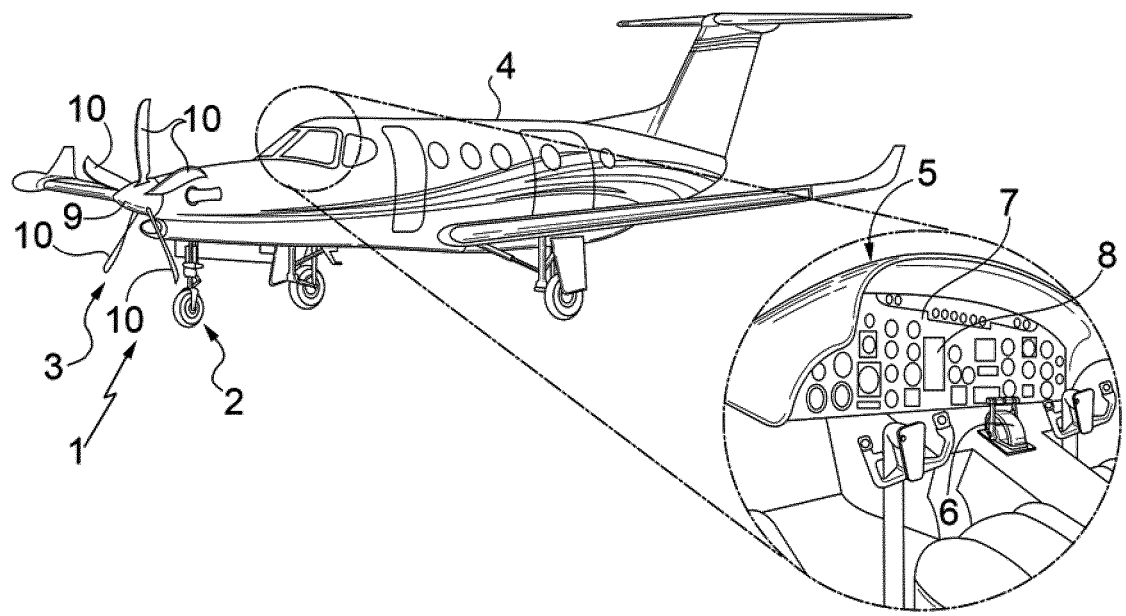
FIG. 1 is a perspective view of an aircraft provided with a turbopropeller engine.
Figure 2:
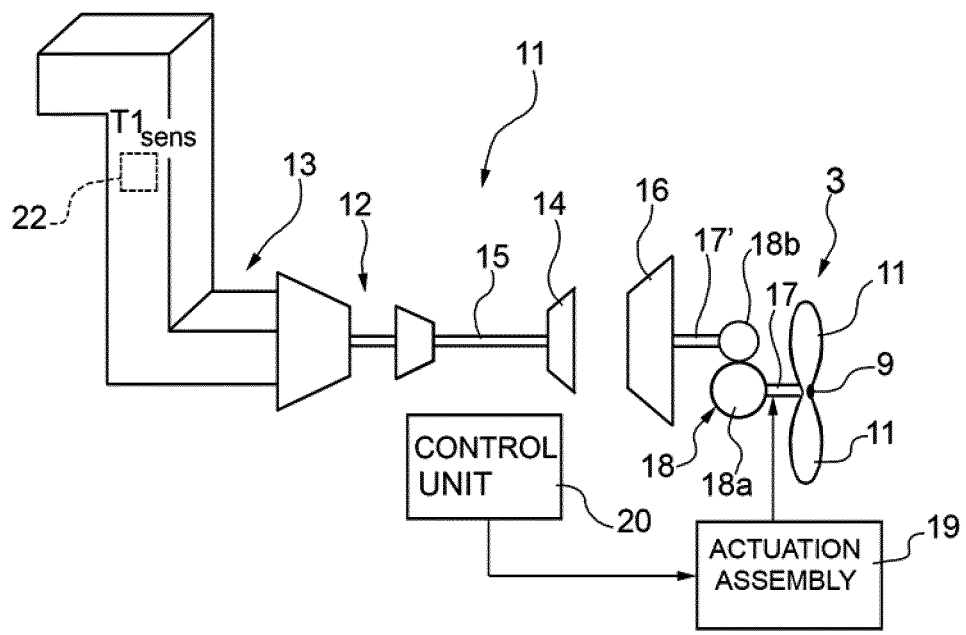
FIG. 2 is a schematic block diagram of the turbopropeller engine of the aircraft.
Figure 3:
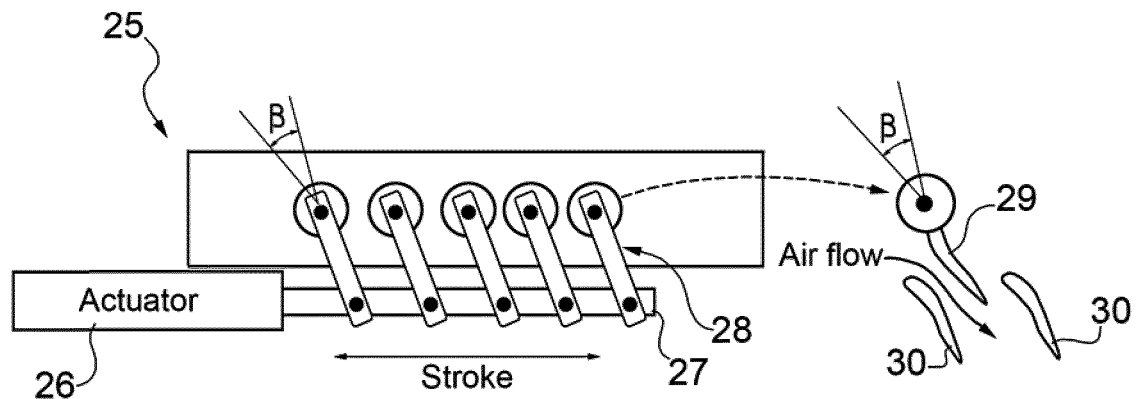
FIG. 3 is a schematic diagram of a Variable Stator Vane (VSV) device of the turbopropeller engine.
Figure 4:
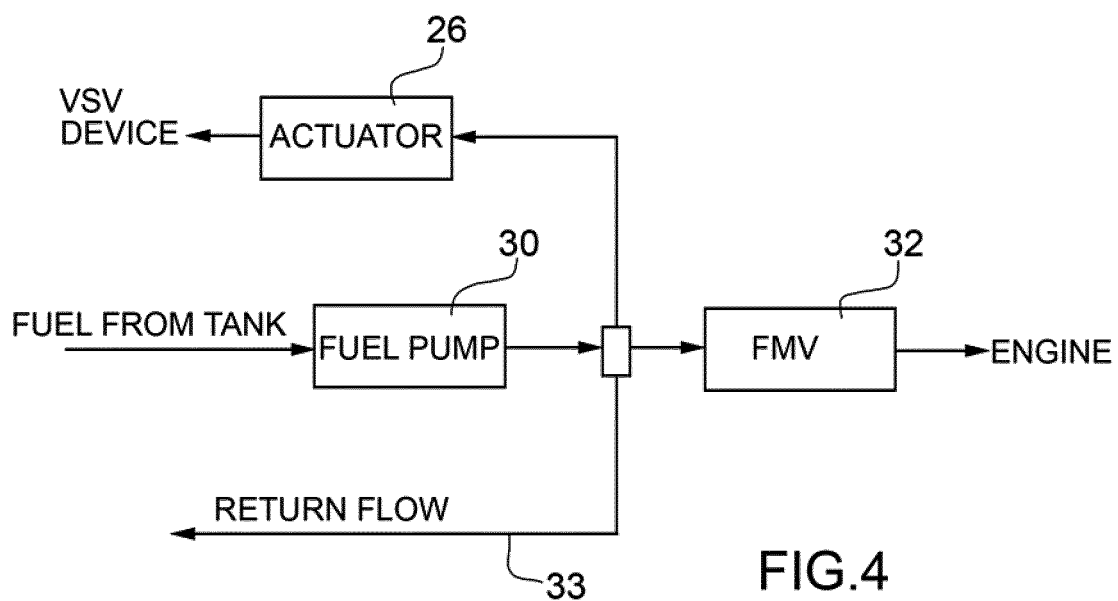
FIG. 4 is a schematic block diagram relating to fuel supply in the turbopropeller engine.
Figure 5:
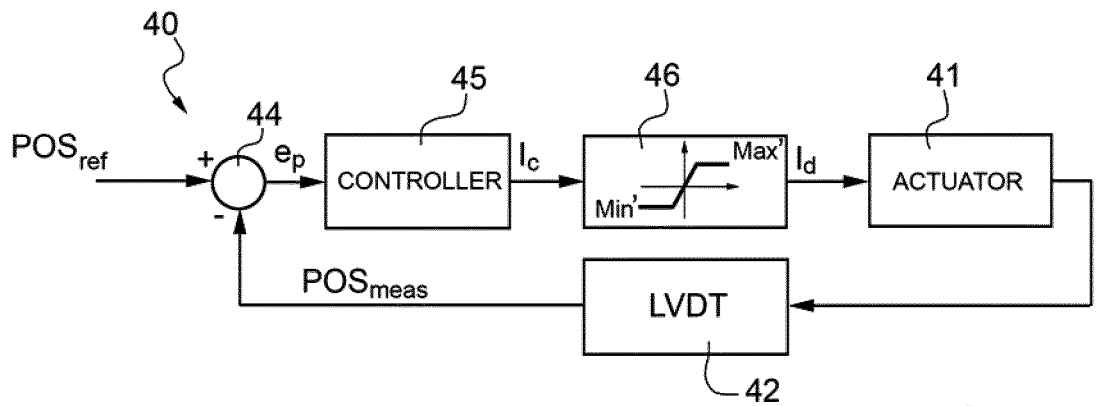
FIG. 5 is a schematic block diagram of a known control system of an electro-hydraulic servo-actuator.

In particular, FIG. 9A shows the plot of the driving current $I_d$ versus time, in the control system 50 according to the present solution (shown in continuous line) and in a known control system (shown in dashed line), where the above discussed control solution is not implemented (e.g. the control system 40 of FIG. 5); FIG. 9A clearly shows the rate-limitation of the driving current $I_d$ envisaged by the present control solution.

FIG. 9B shows the plot of the actuator speed versus time, again showing with a continuous line the plot according to the present control solution and with a dashed line the plot according to the known control solution. FIG. 9B also shows the actuator speed limits, $Speed_{max}$, $Speed_{min}$. FIG. 9B clearly shows that the present control solution allows to avoid the actuator speed to overcome the actuator speed limits, $Speed_{Max}$, $Speed_{min}$, contrary to the known control solution.

The advantages of the present solution are clear from the previous discussion.

In any case, it is again underlined that the present solution provides an effective system to control operation of an electro-hydraulic servo-actuator 26, properly limiting the maximum speed of the same actuator, i.e. the actuator slew rate. Advantageously, the actuator speed is limited dynamically and independently of the nominal characteristic curve (speed vs driving current) of the electro-hydraulic servo-actuator.

In particular, contrary to known electronic control solutions, the present control system 50 allows to fully exploit the capability of the electro-hydraulic servo-actuator 26; contrary to known mechanical control solutions, the present control system 50 does not require complex and expensive control mechanisms.

Finally, it is clear that modifications and variations can be made to what is described and illustrated herein, without thereby departing from the scope of the present invention as defined in the appended claims.

Figure 10:
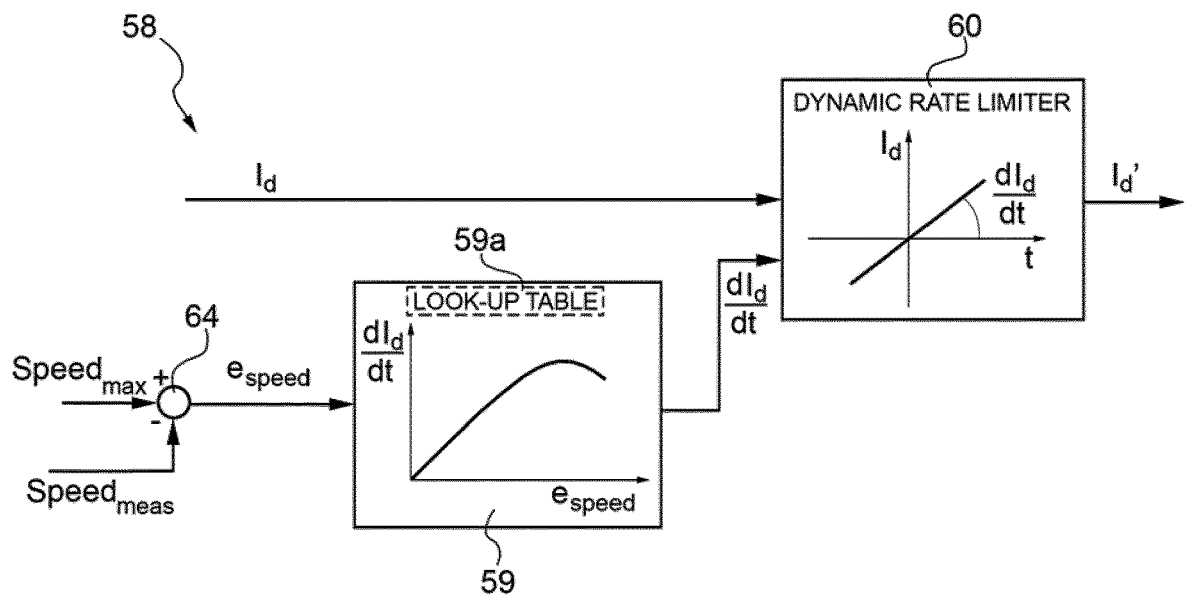
FIG. 10 is a schematic block diagram of a rate-limitation stage in the control system of FIG. 7, according to a different embodiment of the present solution.

In particular, as shown in FIG. 10, in a different embodiment of the limitation stage 58 of the control system 50, the same limitation stage 58 may comprise a second adder block, here denoted with 64, receiving at a first (positive, or summation) input the actuator speed limit $Speed_{Max}$ (the absolute value thereof), and at a second (negative, or subtraction) input the measured actuator speed $Speed_{meas}$, and providing at the output a speed difference $e_{speed}$, as a function of the subtraction between the actuator speed limit $Speed_{Max}$ and the measured actuator speed $Speed_{meas}$.

The look-up table 59a in this case receives as the input the above speed difference $e_{speed}$, and provides the slew rate limit value $dI_d/dt$ based on the same speed difference $e_{speed}$.

In this case, the slew rate limit values $dI_d/dt$ and the values of the speed difference $e_{speed}$ are linked by a linear direct relationship, at least up to a given value of the same speed difference $e_{speed}$, namely when the speed difference $e_{speed}$ increases/decreases, the slew rate limit value $dI_d/dt$ correspondingly increases/decreases.

In other words, when the measured actuator speed $Speed_{meas}$ is far from the actuator speed limit $Speed_{Max}$, the slew rate limit values $dI_d/dt$ are higher; as the measured actuator speed $Speed_{meas}$ approaches the actuator speed limit $Speed_{Max}$, the slew rate limit values $dI_d/dt$ is decreased, so as to limit the actuator acceleration.

In particular, also in this embodiment, the slew rate limit value $dI_d/dt$ is supplied to the dynamic rate limiter 60, which also in this case is configured to limit the slew rate of the driving current $I_d$ based on the slew rate limit value $dI_d/dt$, to provide the rate-limited driving current $I_d'$ for controlling the electro-hydraulic servo-actuator 26.

Moreover, it is underlined that, although the present disclosure has made explicit reference to control of the electro-hydraulic servo-actuator 26 of the VSV device 25 in the turbopropeller engine 2 of the aircraft 1, it is clear that the control system 50 may advantageously be employed for controlling any electro-hydraulic servo-actuator.

In particular, use of the control system 50 is advantageous every time a first valve, e.g. a variable geometry (VG) valve, and a second, different, valve are to be controlled using a same control fluid, to limit the actuator speed of the first valve in order to avoid steering too much control fluid towards the same first valve and away from the second valve.

The invention claimed is:

1. A control system for an electro-hydraulic servo-actuator, comprising:
   a position sensor, configured to provide a measured position of the electro-hydraulic servo-actuator;
   a controller configured to generate a control current, designed to control actuation of the electro-hydraulic servo-actuator, implementing a position control loop based on a position error, the position error being a difference between a reference position and a measured position of the electro-hydraulic servo-actuator provided by the position sensor;
   a limitation stage coupled to the controller and configured to provide a limitation of the actuator speed of the electro-hydraulic servo-actuator, wherein the limitation stage is configured to implement a closed loop control of the actuator speed based on a measured actuator speed and to limit a rate of change of a driving current to provide a rate-limited driving current for controlling the electro-hydraulic servo-actuator in order to limit the actuator speed; and
   a derivative block coupled to the position sensor to receive the measured position and configured to determine the measured actuator speed as a derivative of the measured position.

2. The control system according to claim 1, wherein the limitation stage comprises:
   a determination block configured to receive the measured actuator speed and to determine, based on the measured actuator speed, a slew rate limit value for limiting the rate of change of the driving current; and
   a dynamic rate limiter coupled to the determination block to receive the determined slew rate limit value and configured to limit the slew rate of the driving current based on the slew rate limit value, thus providing the rate-limited driving current for controlling the electro-hydraulic servo-actuator.

3. The control system according to claim 2, wherein the slew rate limit value is designed to determine a maximum ramp slope of a pattern of the driving current versus time.

4. The control system according to claim 2, wherein the determination block is configured to implement a look-up table, providing at an output the slew rate limit value corresponding to an input value of the measured actuator speed.

5. The control system according to claim 4, wherein the look-up table stores matchings between slew rate limit values and measured actuator speeds determined via experimental results.

6. The control system according to claim 4, wherein the slew rate limit values and values of the measured actuator speed are linked by a linear inverse relationship.

7. The control system according to claim 2, wherein the slew rate limit value is proportional to an actuator acceleration value, and the dynamic rate limiter is configured to provide the rate-limited driving current according to the actuator acceleration value.

8. The control system according to claim 2, wherein the determination block is configured to implement a look-up table, providing at an output a slew rate limit value corresponding to the value of a speed difference, between an actuator speed limit and the measured actuator speed.

9. The control system according to claim 1, wherein the driving current is a function of the control current.

10. The control system according to claim 9, further comprising a saturation block interposed between the controller and the electro-hydraulic servo-actuator, configured to receive the control current from the controller, and provide a saturation thereof to maximum and minimum values, in case the control current overcomes the maximum and minimum values, thereby providing the driving current to the limitation stage.

11. A valve arrangement, comprising
   a first valve and a second valve controlled by a same control fluid;

an electro-hydraulic servo-actuator; and a control system to drive the electro-hydraulic servo-actuator designed to control actuation of the first valve in order to limit an actuator speed of the electro-hydraulic servo-actuator, the control system comprising:

a position sensor configured to provide a measured position of the electro-hydraulic servo-actuator;

a controller configured to generate a control current designed to control actuation of the electro-hydraulic servo-actuator and configured to implement a position control loop based on a position error, the position error being a difference between a reference position and a measured position of the electro-hydraulic servo-actuator provided by the position sensor;

a limitation stage coupled to the controller and configured to provide a limitation of the actuator speed of the electro-hydraulic servo-actuator, wherein the limitation stage is configured to implement a closed loop control of the actuator speed based on a measured actuator speed and to limit a rate of change of a driving current to provide a rate-limited driving current for controlling the electro-hydraulic servo-actuator in order to limit the actuator speed; and a derivative block coupled to the position sensor to receive the measured position and configured to determine the measured actuator speed as a derivative of the measured position.

12. A turbopropeller engine for an aircraft, comprising:
a propeller assembly; and
a gas turbine coupled to the propeller assembly, the gas turbine having a valve arrangement and a compressor coupled to an air intake, the valve arrangement comprising:

a first valve and a second valve controlled by a same control fluid;

an electro-hydraulic servo-actuator; and a control system to drive the electro-hydraulic servo-actuator designed to control actuation of the first valve in order to limit an actuator speed of the electro-hydraulic servo-actuator, the control system comprising:

a position sensor configured to provide a measured position of the electro-hydraulic servo-actuator;

a controller configured to generate a control current designed to control actuation of the electro-hydraulic servo-actuator and configured to implement a position control loop based on a position error, the position error being a difference between a reference position and a measured position of the electro-hydraulic servo-actuator provided by the position sensor;

a limitation stage coupled to the controller and configured to provide a limitation of the actuator speed of the electro-hydraulic servo-actuator, wherein the limitation stage is configured to implement a closed loop control of the actuator speed based on a measured actuator speed and to limit a rate of change of a driving current to provide a rate-limited driving current for controlling the electro-hydraulic servo-actuator in order to limit the actuator speed; and a derivative block coupled to the position sensor to receive the measured position and configured to determine the measured actuator speed as a derivative of the measured position, and wherein the first valve is coupled to the compressor to partialize air flow to the compressor, and the second valve is a fuel metering valve configured to control fuel supply to the turbopropeller engine, the control fluid being fuel coming from a fuel tank and provided by a fuel pump.

13. A control method for an electro-hydraulic servo-actuator, comprising:

providing, by a position sensor, a measured position of the electro-hydraulic servo-actuator;

generating a control current to control actuation of the electro-hydraulic servo-actuator;

implementing a position control loop based on a position error, the position error being a difference between a reference position and the measured position of the electro-hydraulic servo-actuator provided by the position sensor; and providing a limitation of an actuator speed of the electro-hydraulic servo-actuator, wherein providing the limitation comprises implementing a closed loop control of the actuator speed based on a measured actuator speed and limiting a rate of change of a driving current to provide a rate-limited driving current for controlling the electro-hydraulic servo-actuator in order to limit the actuator speed, and wherein the measured actuator speed is determined as a derivative of the measured position by a derivative block coupled to the position sensor.

* * * * *